(Model.)

H. H. FINN.
MILK COOLER.

No. 263,692. Patented Sept. 5, 1882.

WITNESSES
F. L. Ouraud
J. E. Oliphant

INVENTOR
Henry H. Finn,
per Chas. H. Fowler,
Attorney

N. PETERS. Photo-Lithographer, Washington, D. C.

UNITED STATES PATENT OFFICE.

HENRY H. FINN, OF ELKDALE, PENNSYLVANIA.

MILK-COOLER.

SPECIFICATION forming part of Letters Patent No. 263,692, dated September 5, 1882.

Application filed July 10, 1882. (Model.)

*To all whom it may concern:*

Be it known that I, HENRY H. FINN, a citizen of the United States, residing at Elkdale, in the county of Susquehanna and State of Pennsylvania, have invented certain new and useful Improvements in Milk-Coolers; and I do hereby declare that the following is a full, clear, and exact description of the same, reference being had to the annexed drawings, making a part of this specification, and to the letters and figures of reference marked thereon.

Figure 1:
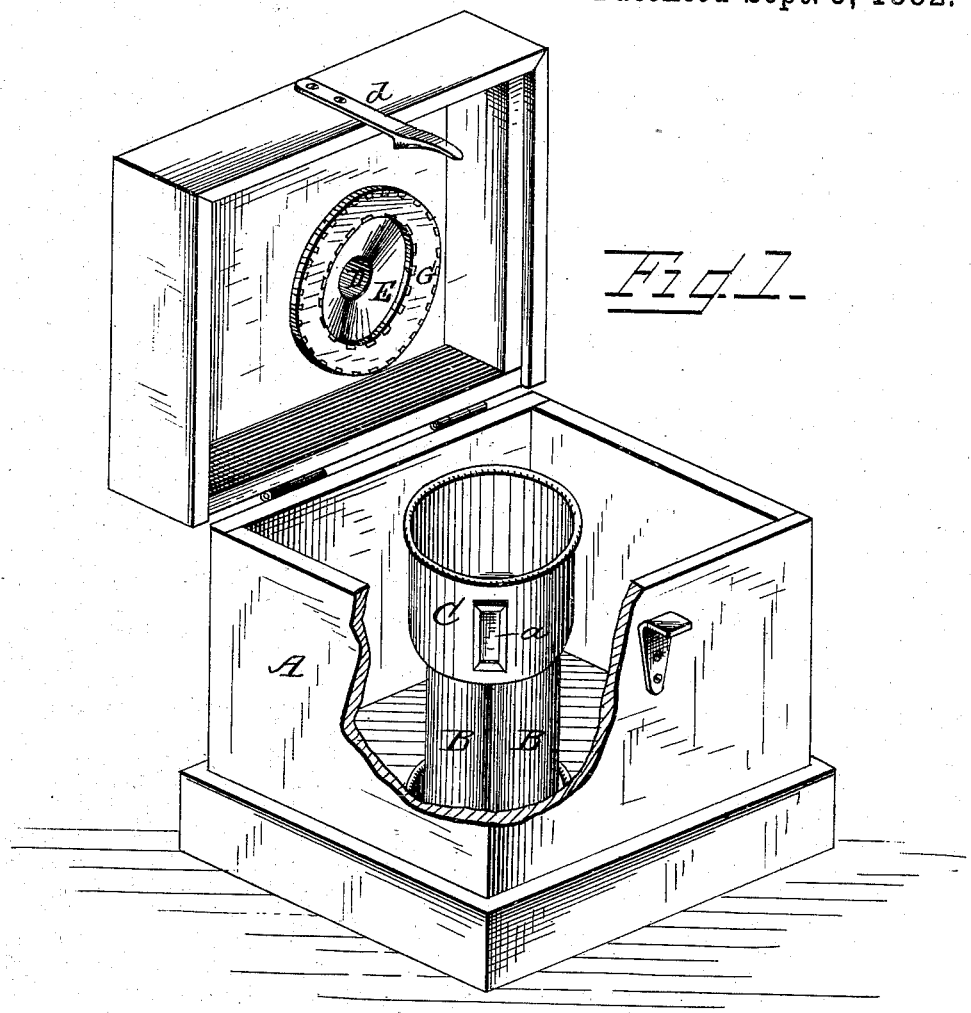
Figure 2:
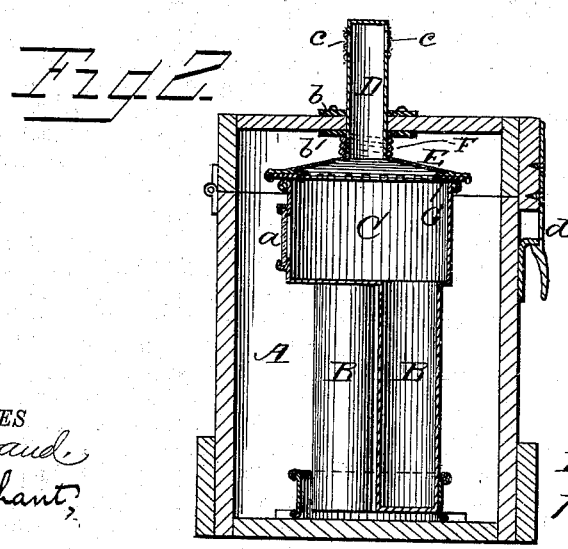

Figure 1 of the drawings is a perspective view of my invention, and Fig. 2 a longitudinal vertical section of the same.

This invention relates to certain new and useful improvements in milk-coolers whereby the animal-heat is quickly expelled from the milk without the ice or cooling-liquid coming in contact with the heat or surrounding atmosphere, thereby greatly reducing the quantity of ice necessary for the proper cooling of the milk, and by the ice or cooling-liquid being kept air-tight the milk cools in less time, and better results in the way of cream are obtained; and the invention consists in connecting to the lid of the chamber or box for containing the cooling agents a dome or cover having upon its under rim a rubber or other air-tight packing to fit down upon the can or vessel containing the milk, this said dome or cover having a flue which passes through the top of the cooling-chamber, and is provided with openings to allow of the escape of animal heat from the milk, said openings being protected by wire-gauze. A spiral spring of sufficient strength is placed around the flue between the top of the cooling-chamber and the dome or cover of the milk-vessel, which serves to press the said dome or cover down firmly upon the milk-vessel when the cooling-chamber is closed. The rubber or other packing prevents the air from entering the cooling-chamber through the flue, and as there are no other openings the air is entirely excluded from the cooling-chamber, and thereby the decomposition of ice is greatly lessened and more cream is obtained in less time than in the coolers now in use.

In the accompanying drawings, A represents the cooling-chamber of a milk-cooler of any ordinary tight construction, in which the ice or cooling-fluid is placed, surrounding a can or milk-vessel, said milk-vessel being preferably formed of two or more tubes, B, closed at their bottoms, and having their top ends entering into a single vessel or pan, C, in which the cream rises. The pan or vessel C is provided with the usual glass, $a$, upon one of its sides, for the determination of the quantity of cream risen upon the milk.

Through the top or cover of the cooling-chamber passes a flue, D, connected to the dome or cover E of the milk-vessel, suitable packing, $b$, being used to exclude the air from entering the cooling-chamber. This flue D is provided at or near its top with openings $c$, for the escape of the heat from the milk, said openings being protected by wire-gauze.

Between the top or cover of the cooling-chamber and the top of the dome or cover of the milk-vessel is placed a spring, F, coiled around the tube D, so that when the top or cover of the cooling-chamber is closed the dome or cover of the milk-vessel is forced tightly down upon the said vessel, and a packing, G, upon the under rim of the said dome or cover serves to prevent any heat or air from entering the cooling-chamber, the top or cover of the said cooling-chamber being held down by means of a spring-catch, $d$.

When the pan or vessel containing the milk is placed in the cooling-chamber and the cover closed down it will be seen that the ice or cooling-liquid will cause the animal heat in the milk to rise and escape through the openings in the flue, and at the same time, the dome or cover of the milk-vessel being provided with suitable air-tight packing upon its under rim and forced tightly down upon the said milk-vessel, will keep the heat or air from entering the cooling-chamber, thereby requiring less ice or cooling-liquid to raise the cream.

Having now fully described my invention, what I claim as new, and desire to secure by Letters Patent, is—

In a milk-cooler, the milk-vessel provided with a dome or cover having upon its under rim an air-tight packing, and connected with a flue having openings at or near its top, in combination with the spiral spring and cooling-chamber, substantially as described, and for the purpose specified.

In testimony that I claim the above I have hereunto subscribed my name in the presence of two witnesses.

HENRY H. FINN.

Witnesses:
JAS. W. LOWRY,
CLARK FINN.